United States Patent [19]
Fourie

[11] Patent Number: 5,411,570
[45] Date of Patent: May 2, 1995

[54] STEELMAKING PROCESS

[75] Inventor: Louis J. Fourie, Newcastle, South Africa

[73] Assignee: Iscor Limited, Pretoria West, South Africa

[21] Appl. No.: 258,970

[22] Filed: Jun. 13, 1994

[30] Foreign Application Priority Data

Jun. 16, 1993 [ZA] South Africa .............. 93/4272

[51] Int. Cl.⁶ .............................................. C21C 5/28
[52] U.S. Cl. ............................. 75/10.15; 75/10.14; 75/10.16; 75/10.17
[58] Field of Search .............. 75/10.15, 10.14, 10.16, 75/10.17

[56] References Cited

U.S. PATENT DOCUMENTS 4,010,029  3/1977  McBride ........................... 75/10.17

Primary Examiner—Peter D. Rosenberg
Attorney, Agent, or Firm—Nixon & Vanderhye

[57] ABSTRACT

A method of making steel, by heating in a channel type induction furnace an iron containing burden and carbon, the carbon being included in the burden and/or contained in hot metal; and maintaining the temperature of the liquid product so formed above its liquidus temperature by controlling the amount of heat supplied to the furnace and/or the rate at which the burden is added to the furnace.

20 Claims, 4 Drawing Sheets

STEELMAKING PROCESS

This invention relates to a method for making steel.

The conventional steelmaking process whereby so called 'hot metal' (approximately 4% carbon) is produced in a blast furnace or the like through the reduction of iron ore with coke, coal and the like, and whereby the hot metal is then subsequently decarbonised, suffers from various disadvantages.

Some of such disadvantages, for example, relate to the high cost of, and the air pollution related to, coke making; the high energy costs associated with the number of heating and cooling cycles involved in the process; and the high refractory material costs and risks resulting from the fact that during the process liquid metal at temperatures in excess of 300 degrees C. above liquidus temperature must be catered for.

Although the employment of electric are furnaces which utilise scrap metal and/or sponge iron instead of hot metal as an alternative for the aforesaid conventional process has overcome some of the problems associated with the latter, it unfortunately does not present an absolute solution to such problems. In addition it also creates problems of its own, rendering it uneconomical relative to the blast furnace route for the production of steel from ore.

In present research conducted elsewhere, so called smelting reduction processes are employed in which coal and partially reduced iron ore are reacted in a converter type vessel in which part of the coal is burnt to provide the required heat while the rest of the carbon and hydrogen in the coal is utilised for the reduction of the iron ore.

The aforesaid processes also suffer from various disadvantages, the major one being that the slag which is formed, and which has a high FeO-content, has to be heated to very high temperatures (higher that 1650 degrees C. if crude steel is to be tapped) thus giving rise to a product which is very aggressive towards most commercially known refractory materials. It furthermore requires the addition of large quantities of lime and/or dolomitic lime and expensive sulphur removal.

Furthermore, if crude iron (hot metal) is to be tapped from the smelting reduction vessel, a process for making crude steel (decarbonising process) is further required.

It is accordingly an object of the present invention to provide a method for making steel which the applicant believes has certain distinct advantages over the aforesaid known arrangements.

According to the invention a method of making steel includes the steps of heating in a furnace a burden containing iron; and carbon, the carbon being included in the burden and/or contained in hot metal; and maintaining the temperature of the liquid product so formed above its liquidus temperature by controlling the amount of heat supplied to the furnace and/or the rate at which the burden is added to furnace.

Further according to the invention the furnace is a channel type induction furnace.

The iron containing component of the burden may consist of sponge iron, partially reduced iron ore, self reducing iron ore pellets or fine iron ore.

The optimum degree of reduction of the partially reduced iron ore is dependent on the size of the particles. Larger particles must preferably be reduced to a higher degree.

Self reducing iron ore pellets consist of fine ore and fine coal formed into pellets with a suitable binder.

Chromium and/or manganese containing ores may be part of the burden if significant levels of these alloying elements are required in the end product.

It will be appreciated that in the latter instance the operational conditions with respect to temperatures and carbon levels will have to be varied to obtain optimum economic effects.

Preferably the temperature of the liquid product is maintained approximately 50 to 100 degrees C. above its liquidus temperature.

Other iron containing charge materials which may be used may include scrap steel and/or cold iron.

The burden may also include one or more suitable fluxes.

It will be appreciated that when carbon is not introduced as part of the hot metal charge, but only as part of the burden, the aggregate sensible heat input in the charge material is low. A disadvantage of such a process accordingly will be the higher electrical energy consumption per ton of metal produced, and the lower production rates which will result.

On the other hand, the advantages of such an arrangement will be the elimination of a hot metal producing facility and the lower phosphorous burden and resultant lower flux consumption.

Preferably the channel type induction furnace comprises an elongated susbstantially horizontally disposed hollow cylinder which is provided along its bottom wall with two rows of induction heaters.

Preferably each row comprises four such heaters, each having a heating capacity of approximately 5 MW.

It will be appreciated that because such heaters are located below the overlying liquid product, such heat will dissipate through the liquid by means of convection. This also serves to eliminate the danger of excessive carbon boil in the liquid product.

Further according to the invention the method includes the step of burning above the burden the carbon monoxide which results from the reaction and which permeates the burden floating on the liquid product.

It will be appreciated that before escaping from such burden, the carbon monoxide will also serve the purpose of reducing the iron oxide higher up in the burden. It will further be appreciated that such carbon monoxide coming from the burden serves to shield the burden against the ingress of oxygen.

The aforesaid burning may, for example, be effected by supplying oxygen to the furnace interior through suitable burners or nozzles. The use of air preheated by exchanging heat with the off gas, used as such, or enriched with oxygen, may be more economical.

Further according to the invention the heat created by the burning of the carbon monoxide is utilised for heating new material being added to the burden.

The burning carbon monoxide may of course also serve to heat the roof of the furnace.

As a result of this, and direct radiation from the burner flames, the burden could be heated in this manner to temperatures as high as 1400 degrees C. or higher without damaging the roof refractories of the furnace.

The steel scrap or cold iron charge may be preheated by allowing the spent carbon monoxide related gas to discharge through the same opening in the furnace through which steel scrap or cold iron is being added to the furnace.

Furthermore, since the velocity of the carbon monoxide through the overlying burden and that part of the furnace above it is relatively low, dust formation is at a very low level. Also, because there is no gaseous oxygen impinging onto or through the liquid product, no red oxide fumes are generated.

Metal loss to the slag in the form of oxides of the metal is simultaneously controlled by the equilibrium which is reached with the carbon in solution in the liquid product and the activity coefficient determined by its interaction with other slag components.

Further according to the invention the method includes the step of tapping liquid steel containing in the order of 0.10% carbon from the furnace at a temperature in the order of 1580 to 1620 degrees C.

Such steel may be treated in a conventional ladle furnace for temperature and compositional control, and either further decarburised in vacuum, or alloyed and cast.

The aforesaid tapping carbon content of 0,10% is chosen to ensure a reasonable slag iron content, while allowing good dephosphorisation at the required slag basicity. Although lower carbon levels are possible, this will be at the expense of higher iron losses to the slag.

Further according to the invention the burden inlet(s) and molten steel outlet are so positioned in the furnace that the latter is 'divided' into a primary section, and a secondary section located towards the said outlet, the primary section being approximately three times the size of the secondary section.

A dividing wall or weir is preferably provided for preventing mixing of the liquid metal of the primary and secondary compartments when the furnace is tilted towards the tapping side.

Preferably, also, an overflow notch is provided and so positioned in the dividing wall that metal can flow from the primary to the secondary compartment when the furnace is in the horizontal position or tilted slightly backwards.

The metal can also be transferred from the primary to the secondary compartments through an external duct. The space above the burden and the meniscus of the two compartments is not divided. Alternatively the functions of the two compartments can be performed in separate vessels.

Still further according to the invention the arrangement is such that the flux additions to the primary section renders the resulting slag relatively acid.

This allows most of the gangue charged to the furnace, as well as all silicon charged with the hot metal and scrap, to be removed at relatively low cost due to low iron losses and low flux and energy costs.

Still further according to the invention the arrangement is such that flux additives to the secondary section renders the slag there basic. This together with the higher iron oxide content of the slag in this section gives rise to an effective phosphorous removal.

One embodiment of apparatus according to the invention will now be described by way of example with reference to the enclosed drawings, in which FIG. 1 is a diagrammatic side view of a furnace according to the invention;

Figure 1:
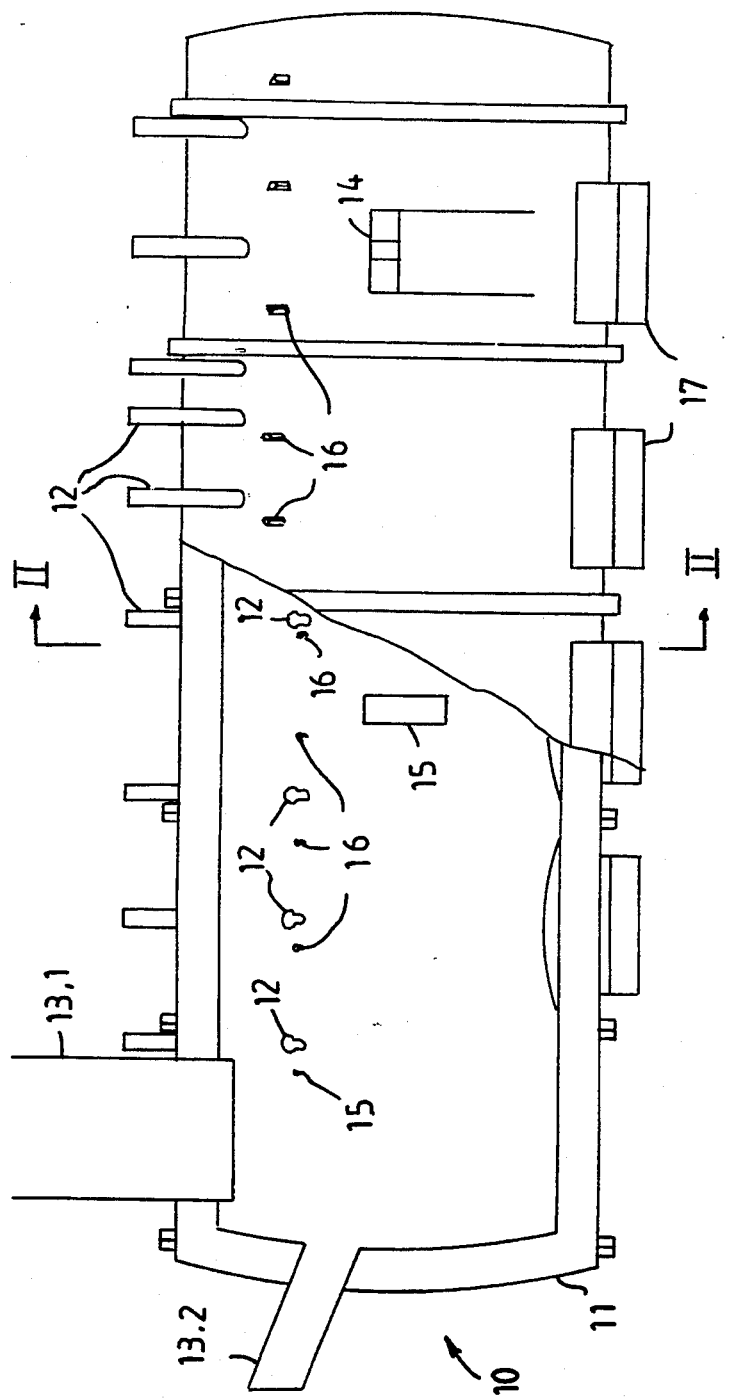

In this embodiment of the invention a channel type induction furnace 10 comprises an elongated hollow cylindrical steel vessel 11 which has a plurality of inlet openings 12 along its upper side; a scrap metal inlet duct 13.1; a liquid metal charging trough 13.2; a molten steel outlet hole 14 on its one side; and an acid slag taphole 15 on its opposite side. The said upper side also houses a plurality of oxygen burners or nozzles 16 of which the outlets extend into vessel 11.

Vessel 11 is provided along its bottom with two rows of four induction heaters 17 each.

The power output of each of heaters 17 is in the order of at least 2,5 to 5 MW. It will be appreciated that more or fewer such heaters may be employed.

A transversely extending dividing wall 22 (FIG. 3) provided in vessel 11 serves to divide furnace 10 into two compartments, the purpose of which will be explained later.

In operation the hot metal charge is introduced to vessel 11 through a sliding gate (not shown) or by careful lip pouring through trough 13.2.

The scrap metal charge is introduced via duct 13,1 the arrangement being such that a heap of scrap is formed extending approximately three meters into duct 13,1, the purpose for which has already been explained.

Figure 2:
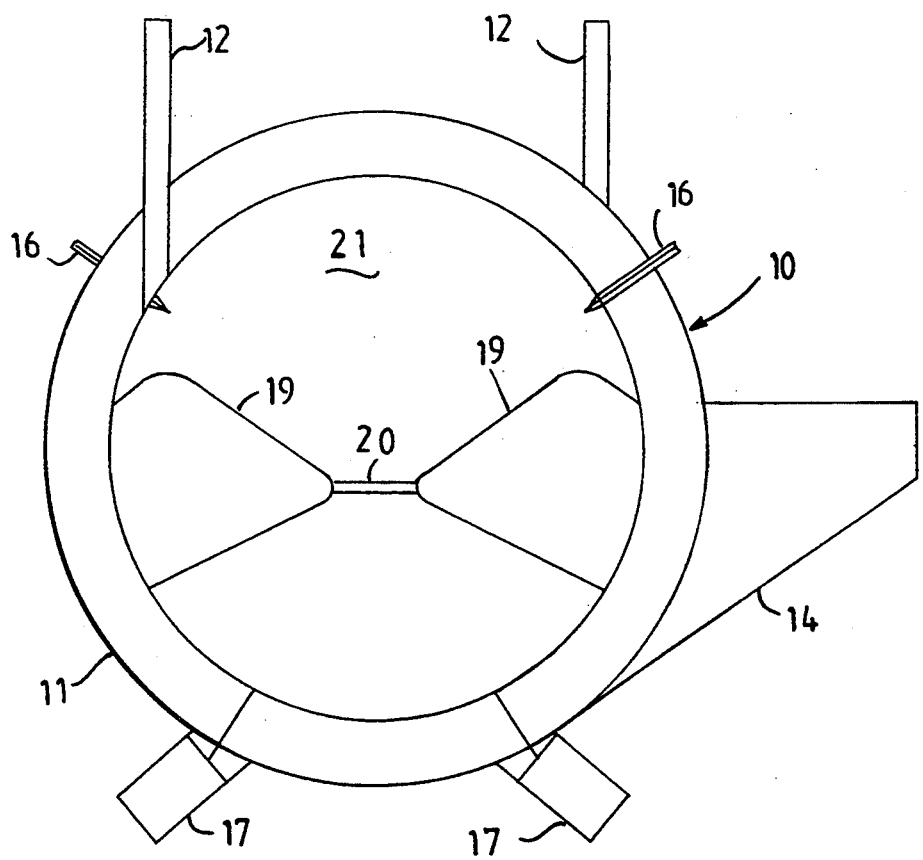
FIG. 2 is a cross section on line II:II in FIG. 1.

As can be seen from FIG. 2, those holes 12 through which the burden is introduced are arranged in such a manner that they can discharge their load close to the inner sides of vessel 11, there being no holes 12 in the vicinity of holes 14 and 15.

Figure 3:
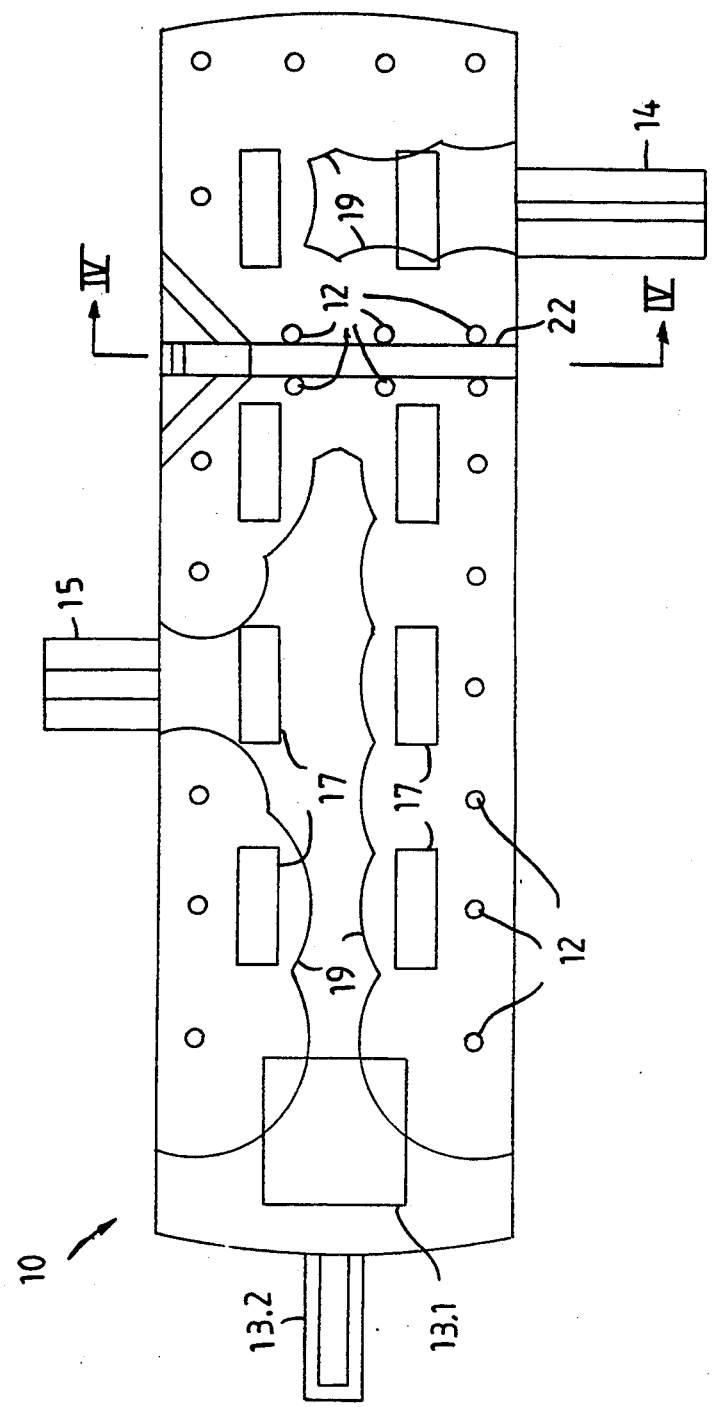
FIG. 3 is a diagrammatic plan view of the interior of the furnace of FIG. 1 as seen from above.
Figure 4:
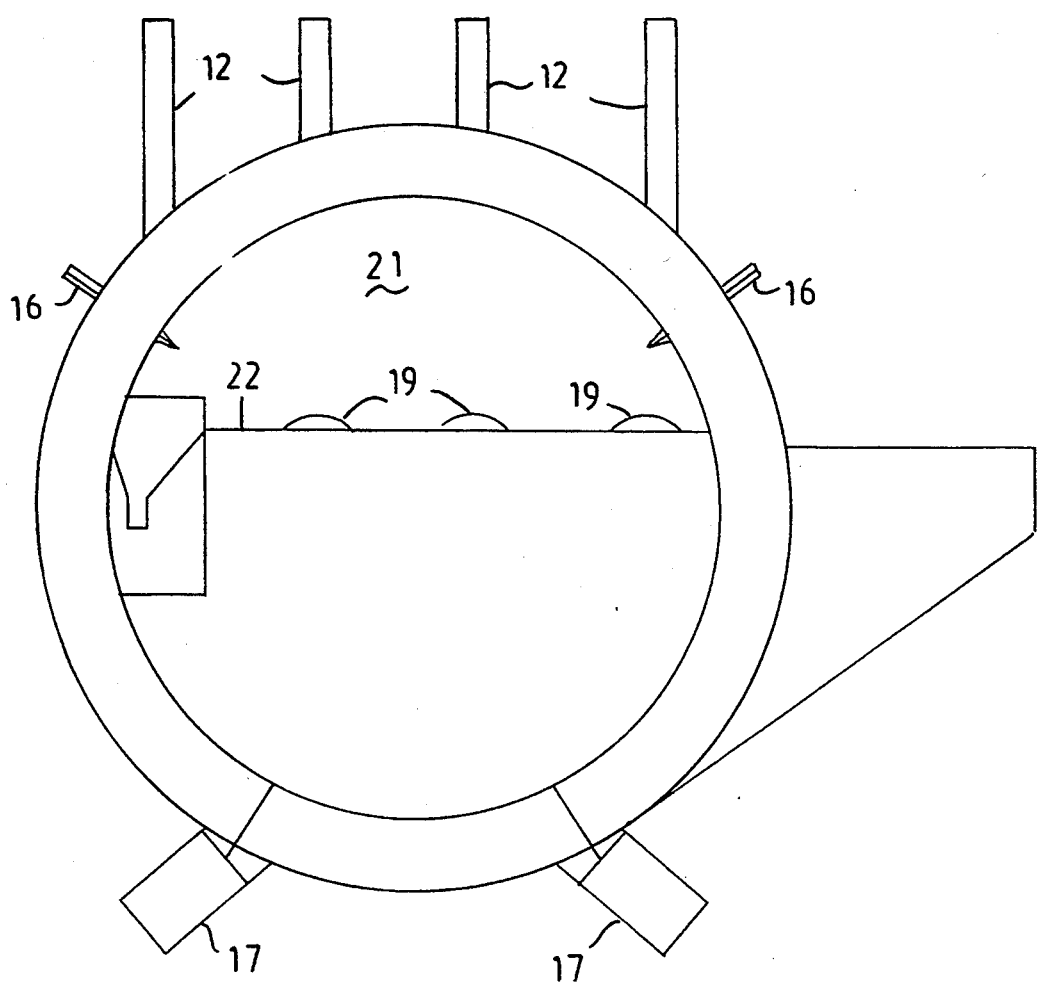
FIG. 4 is a diagrammatic cross section on line IV:IV in FIG. 2.

As is shown in FIGS. 2 and 3, the liquid metal level in furnace 10 is maintained more or less half the depth of vessel 11 so that the burden 19 of sponge metal and fluxes and the slag layer 20 can float on top of it while leaving a compartment 21 above them which serves as a combustion chamber in which carbon monoxide permeating through burden 19 can be burnt with oxygen from burners or nozzles 16.

During the process the sloping upper surface of the floating burden 19 is intermittently covered by a new layer of burden fed through holes 12. The sloping upper surface also serves to ensure that burden which may be melted by the heat from the flames and roof will, after filling of the voids between the particles, flow down to the centre of the furnace. This flowing of freshly molten burden, ensures that cooler solid burden is exposed, resulting in good heat transfer and reduced demand on electrical energy supplied by the induction heaters 17.

If the burden 19 contains suitably fine metal bearing particles that are either partially reduced or not reduced at all (as in the case of self reducing pellets) and carbon, then the rates of the reactions are high. Since the nett thermal effect of the reduction reactions with carbon is endothermic, the temperature of the exposed layer of burden rises at a lower rate. This results in a greater temperature differential between the burden on the one hand, and the flames and the furnace roof on the other hand. This in turn leads to high rates of heat transfer.

These factors all contribute to the absorption of large amounts of energy before a layer of burden is covered by the next layer.

As can be seen from FIG. 3, the openings 12 are so located that slag 20 flows in a trough like corridor which extends between the two sections of burden 19 from inlet 13 towards outlet 15, the latter serving as the acid slag tap hole of furnace 10. Outlet 14 serves as the outlet for the basic slag as well as for the molten metal. As a result of the aforesaid arrangement and the aforesaid dividing wall 22, the inside of vessel 11 is divided into a primary compartment which extends from inlet 13 about three quarters the length of vessel 11 and a secondary compartment which extends over the rest of the length of vessel 11.

Wall 22 serves to prevent mixing of the liquid metal of the primary and secondary compartments when furnace 10 is tilted towards the tapping side. An overflow notch (not shown) is provided in wall 22 in such a position that metal can flow from the primary to the secondary compartment when furnace 10 is in the horizontal position or tilted slightly backwards in a direction away from the tapping position.

The hot metal, scrap steel or solid iron and the major portion of the burden are charged to the aforesaid primary compartment and the steel is tapped from the secondary compartment.

As pointed out above, the flux additives are such that in the primary compartment the slag 20 is rendered relatively acid and in the secondary compartment relatively basic.

The method of the invention will now be described further by means of the following examples.

EXAMPLE 1 (With Hot Metal)

Vessel 11 of furnace 10 is charged with 83 tonne of hot metal, 20 tonne scrap metal and 72 tonne of 65% metallised sponge iron per hour, the latter being at a temperature in the order of 700 degrees C. It will be appreciated that because of the relatively low metallisation of the sponge iron, a very high throughput in the shaft furnace producing the sponge iron is possible.

The furnace is operated at a power rating of below 30 MW to produce 159 tonne of steel per hour. The steel, which is tapped at 1580 degrees C., contains approximately 0,10% C and below 0,015% of P.

The most important consumption rates are as follows:

| Electricity | 180 kWh/t |
|---|---|
| Lime & dolomite | 50 kg/t |
| Oxygen | 40 kg/t |
| Refractory repairs | 2 kg/t |
| Gas or oil/fuel | 5 kg/t |

EXAMPLE 11 (Without Hot metal)

Vessel 11 of furnace 10 is charged with 83 tonnes of cold, 91% metallised sponge iron and 20 tonne of cold scrap metal per hour. The furnace is operated at a power rating of below 30 MW to produce 90 tonnes of steel per hour.

The most important consumption rates are as follows:

| Electricity | 280 kWh/t |
|---|---|
| Lime & dolomite | 65 kg/t |
| Oxygen | 85 kg/t |
| Refractory repairs | 3 kg/t |
| Gas or oil (fuel) | 25 kg/t |
| Coke (or other reductant) | 11 kg/t |

(Instead of fuel and coke, coals of varying volatile content can be used).

EXAMPLE 111 (Without Hot Metal)

Vessel 11 of furnace 10 is charged with 87 tonnes of hot (700 degrees C.) 65% metallised sponge iron and 20 tonnes of cold scrap metal and the furnace operated at a power rating of below 30 MW to produce more than 90 tonne of steel per hour.

The most important consumption rates are as follows:

| Electricity | 280 kWh/t |
|---|---|
| Lime & dolomite | 65 kg/t |
| Oxygen | 72 kg/t |
| Refractory repairs | 3 kg/t |
| Gas or oil (fuel) | 7 kg/t |
| Coke (or other reductant) | 59 kg/t |

It can be seen that although the lower metallisation of the sponge iron of this example compared to that of Example 11 allows much higher production rates in the shaft furnace producing the sponge iron, it does not significantly alter the production rate or treatment cost for the process performed in furnace 10.

EXAMPLE IV (Iron ore)

Vessel 11 of furnace 10 is charged with 133 tonnes of magnetite ore which had been mixed with 43 tonnes of coal and formed into pellets with 1,33 tonnes of bentonite, while the furnace is operated at a power rating of below 37 MW to produce approximately 93 tonne of steel per hour.

The most important consumption rates are as follows:

| Electricity | 400 kWh/t | |
|---|---|---|
| Limestone | 118 kg/t | |
| Raw dolomite | 93 kg/t | |
| Hot air (1000° C.) | 2080 kg/t | (produced by exchanging heat with the off gas.) |
| (Or Oxygen: | 490 kg/t) | |
| Magnetite ore | 1430 kg/t | |
| Coal | 465 kg/t | |

Excess energy from this operation, whether oxygen or preheated air is used, is more than sufficient for generating the electric power required by the induction heaters.

It will be appreciated that the furnace design for this alternative will allow for a greater surface area for heat transfer from the flames and roof to the burden.

It will further be appreciated that this alternative elimantes the need for a direct reduction plant, and that the process transforms iron ore directly to crude liquid steel.

It will be appreciated that the method and apparatus according to the invention provide an integrated arrangement in which steel can be produced and by means of which many of the problems referred to above as being encountered with the conventional type processes can be overcome or at least minimised.

It will be appreciated further that there are no doubt many variations in detail possible with a method and apparatus according to the invention without departing from the spirit and/or scope of the appended claims.

I claim:

1. A method of making steel in a channel-type induction furnace, including the steps of heating in the channel-type induction furnace a burden containing iron and carbon; and maintaining the temperature of the liquid product so formed above its liquidus temperature by controlling at least one of (i) the amount of heat supplied to the furnace and (ii) the rate at which the burden is added to the furnace.

2. The method of claim 1 wherein the carbon is contained in hot metal.

3. The method of claim 1 wherein the iron containing component of the burden comprises at least one of (i) sponge iron, (ii) partially reduced iron ore, (iii) self reducing iron ore pellets, (iv) fine iron ore.

4. The method of claim 1 wherein the temperature of the liquid product is maintained approximately 50 to 100 degrees C. above its liquidus temperature.

5. The method of claim 1 wherein the burden also includes other iron containing charge materials comprising at least one of (i) scrap steel (ii) cold iron.

6. The method of claim 1 wherein the burden includes at least one of (i) a chromium containing ore and (ii) a manganese containing ore.

7. The method of claim 1 including at least one flux.

8. The method of claim 1, wherein the channel type induction furnace comprises an elongated horizontally disposed hollow cylinder which is provided along its bottom wall with two rows of induction heaters.

9. The method of claim 1 wherein the channel type induction furnace comprises an elongated horizontally disposed hollow cylinder which is provided along its bottom wall with two rows of four induction heaters, each heater having a heating capacity of 5 MW.

10. The method of claim 1 including the step of burning above the burden the carbon monoxide which results from the reaction and which permeates the burden floating on the liquid product.

11. The method of claim 10 wherein the burning is effected by supplying at least one of the compounds: (i) oxygen, (ii) preheated air, (iii) oxygen enriched preheated air to the furnace interior.

12. The method of claim 10 wherein the heat created by the burning of the carbon monoxide is utilised for heating at least one of (i) the new material being added to the burden (ii) the roof of the furnace.

13. The method of 10 wherein the iron containing charge is preheated by allowing the spent carbon monoxide related gas to discharge through the same opening in the furnace through which the iron containing charge is added to the furnace.

14. The method of claim 1 including the step of tapping liquid metal containing 0.10% carbon from the furnace at a temperature of between 1580 and 1620 degrees C.

15. The method of claim 14 wherein the tapped metal is treated in a conventional ladle furnace for temperature and compositional control.

16. The method of claim 1 wherein the furnace includes at least one burden inlet and one molten metal outlet which are so positioned in the furnace that the furnace is divided into a primary compartment, and a secondary compartment located towards the said outlet, the primary compartment being three times the size of the secondary compartment.

17. The method of claim 16 wherein a dividing wall is provided for preventing mixing of the liquid metal of the primary and secondary compartments when the furnace is tilted towards the tapping side.

18. The method of claim 16 wherein a dividing wall is provided for preventing mixing of the liquid metal of the primary and secondary compartments when the furnace is titled towards the tapping side and an overflow notch is provided and positioned in such a way in the dividing wall that metal can flow from the primary to the secondary compartment when the furnace is in the horizontal position or tilted slightly backwards.

19. The method of claim 16 wherein flux additions are made to the primary compartment to render the slag there acid.

20. The method of claim 16 wherein flux additions are made to the secondary compartment to render the slag there basic.

* * * * *